US007188341B1

(12) United States Patent
Hawthorne et al.

(10) Patent No.: US 7,188,341 B1
(45) Date of Patent: Mar. 6, 2007

(54) METHOD OF TRANSFERRING FILES AND ANALYSIS OF TRAIN OPERATIONAL DATA

(75) Inventors: Michael J. Hawthorne, Watertown, NY (US); Stephen K. Nickles, Burleson, TX (US); John E. Haley, Burleson, TX (US); Dale L. Sherwood, Ft. Worth, TX (US)

(73) Assignee: New York Air Brake Corporation, Watertown, NY (US)

( * ) Notice: Subject to any disclaimer, the term of this patent is extended or adjusted under 35 U.S.C. 154(b) by 352 days.

(21) Appl. No.: 09/404,826

(22) Filed: Sep. 24, 1999

(51) Int. Cl.
*G06F 9/44* (2006.01)
*H04B 7/00* (2006.01)
*G05D 1/00* (2006.01)

(52) U.S. Cl. .................... 717/171; 455/525; 701/24
(58) Field of Classification Search ............ 717/171–3; 455/525; 701/1, 19, 24
See application file for complete search history.

(56) References Cited

U.S. PATENT DOCUMENTS

| 4,041,283 | A |   | 8/1977  | Mosier              |         |
|-----------|---|---|---------|---------------------|---------|
| 4,042,810 | A |   | 8/1977  | Mosher              |         |
| 4,181,943 | A |   | 1/1980  | Mercer, Sr. et al.  |         |
| 4,561,057 | A |   | 12/1985 | Haley, Jr. et al.   |         |
| 4,602,335 | A |   | 7/1986  | Perlmutter          |         |
| 4,794,548 | A |   | 12/1988 | Lynch et al.        |         |
| 4,827,438 | A |   | 5/1989  | Nickles et al.      |         |
| 4,896,580 | A |   | 1/1990  | Rudnicki            |         |
| 4,912,471 | A | * | 3/1990  | Tyburski et al.     | 340/505 |
| 5,117,502 | A | * | 5/1992  | Onoda et al.        | 455/437 |
| 5,218,629 | A | * | 6/1993  | Dumond et al.       | 455/412.1 |
| 5,420,883 | A |   | 5/1995  | Swensen et al.      |         |
| 5,442,553 | A | * | 8/1995  | Parrillo            | 455/420 |
| 5,491,486 | A |   | 2/1996  | Welles, II et al.   |         |
| 5,533,695 | A |   | 7/1996  | Heggestad et al.    |         |
| 5,620,155 | A | * | 4/1997  | Michalek            | 246/121 |
| 5,691,980 | A |   | 11/1997 | Welles, II et al.   |         |
| 5,744,707 | A |   | 4/1998  | Kull                |         |
| 5,785,283 | A | * | 7/1998  | Ehrenberger et al.  | 246/62  |
| 5,786,998 | A |   | 7/1998  | Neeson et al.       |         |

(Continued)

FOREIGN PATENT DOCUMENTS

EP          114 633         8/1984

(Continued)

OTHER PUBLICATIONS

Ben-Yaacov, Gideon et al., "Technological Advances in Railroads' Work Order Reporting Systems," 1989, IEEE 39th Vehicular Technology Conference, vol. 2, pp. 682-688.*

(Continued)

*Primary Examiner*—Tuan Dam
*Assistant Examiner*—Eric B Kiss
(74) *Attorney, Agent, or Firm*—Barnes & Thornburg LLP (57) ABSTRACT

A method of transferring files between a computer on board a train and a remote station including determining if the remote station is within range of the train and establishing wireless communication between the onboard computer and the remote station. Next, the computer determines whether there are files to be transferred, and if so, transfers the file. If the remote station has updates to be transferred to the train, such updates are transferred to the onboard computer. Files and updates are also transferred between remote stations and between remote stations and a home base station. A method of adjusting a simulator includes inputting data from the train onto a simulator. The simulator is operated with the data and the simulator automatically adjusts the parameters of the simulator until the data of the simulator matches the data from the train. The data can then be process and analyzed.

22 Claims, 6 Drawing Sheets

U.S. PATENT DOCUMENTS

| | | | |
|---|---|---|---|
| 5,822,697 A * | 10/1998 | Matsuzawa | 455/443 |
| 5,823,481 A * | 10/1998 | Gottschlich | 246/28 R |
| 5,848,064 A | 12/1998 | Cowan | |
| 5,893,043 A * | 4/1999 | Moehlenbrink et al. | 701/207 |
| 5,974,081 A * | 10/1999 | Rosas et al. | 375/133 |
| 5,978,718 A * | 11/1999 | Kull | 701/19 |
| 6,073,019 A * | 6/2000 | Lowdon | 455/436 |
| 6,144,901 A | 11/2000 | Nickles et al. | |
| 6,218,961 B1 * | 4/2001 | Gross et al. | 340/903 |
| 6,373,403 B1 * | 4/2002 | Korver et al. | 340/988 |

FOREIGN PATENT DOCUMENTS

| | | |
|---|---|---|
| EP | 257 662 | 3/1988 |
| EP | 539 885 | 5/1993 |
| EP | 539885 A2 | 5/1993 |
| EP | 0748085 A1 | 12/1996 |
| EP | 0755840 | 1/1997 |
| GB | 2188464 | 9/1987 |
| JP | 10-203369 | 8/1998 |
| WO | WO 90/3622 | 4/1990 |
| WO | WO 99/14090 | 3/1999 |

OTHER PUBLICATIONS

Burns, Roger D., "Safety and Productivity Improvement of Railroad Operations by Advanced Train Control Systems," 1989, Technical Papers Presented at the 1989 IEEE/ASME Joint Railroad Conference, pp. 33-38.*

Moody, Howard G., "Advanced Train Control System Design and Use," 1991, Proceedings of the 1991 IEEE/ASME Joint Railroad Conference, pp. 43-51.*

Todd Crane and Jeff Eilenberg, "Locomotive 6724, Where Are You?, Integrations of GPS, Mobile Telemetry, and GIS Technologies in a Railroad Environment," Jul. 1997, 1997 ESRI International User Conference, San Diego Convention Center, pp. 1-9.*

"Microsoft Press Computer User's Dictionary," 1998, Microsoft Press, pp. i, ii, 142.*

David C. Coll, et al., "The Communications System Architecture of The North American Advanced Train Control System," Aug. 1990, IEEE Transactions on Vehicular Technology, vol. 39, No. 3, pp. 244-255.*

Hamid R. Sharif And Edward L. Furman, "Analytical Model for ATCS Inbound RF Channel Throughput," 1991, $41^{st}$ IEEE Vehicular Technology Conference, pp. 885-892.*

* cited by examiner

METHOD OF TRANSFERRING FILES AND ANALYSIS OF TRAIN OPERATIONAL DATA

SUMMARY AND BACKGROUND OF THE INVENTION

The present invention relates to the collection, transmission and analysis of real time information data between a train and remote stations and the use of real time information on the train.

The communication between a remote station and a moving train has generally been via radio waves. This is generally voice communication to the engineer. Some systems use ground terminal control computers for receiving and transmitting digital information to the data management system aboard a locomotive from a central location. Wayside inspection devices are also located at various points along the track and provide track status information and train inspection information. One example of such a system is described in U.S. Pat. No. 4,896,580. Communication of position as well as other parameters may be via satellite as described in U.S. Pat. No. 5,491,486. The data being transmitted to the trains are generally track occupancy or track control information to be used by the engineer on board. The information being transmitted from the train to the central office is general status of train operating conditions. A general discussion of central location to train communication as well as tracking reporting equipment inventory in a locomotive is described in U.S. Pat. No. 5,786,998.

Trains generally include event recorders. The information on the event recorders is data and status of different variables and operating conditions on the train recorded as a function of time. This information is downloaded and used for various analyses. A computer can also be used to analyze or printout speed, acceleration/deceleration and distance traveled from this recorded data. Such a system is described in U.S. Pat. Nos. 4,561,057 and 4,794,548.

Historically, the information from the event recorder has been printed out on strip recordings or tables and analyzed by hand. Playing the information back on a simulator using the data from the train recorder is described in U.S. Pat. No. 4,827,438. The simulator uses its own mathematical algorithms of the train physics and plays back the results of this processed data. It does not take into account variations of the train parameters which were assumed in the algorithms. These assumptions induce errors and thus, the response of the operator on the simulator may appear to be inappropriate. As suggested in the '438 patent, the system can detect potential errors and provide the operator with the relative magnitude of the error. Based on this error, the train efficiencies can be reprogrammed into the computer to adjust for this error. The reprogramming is done manually by the simulator operator based on his experience.

The present invention provides a method of transferring files between a computer on board a train and a remote base station, also to be known herein as a remote base station. The method includes determining if the remote station is within range of the train and establishing wireless communication between the onboard computer and the remote station. Next, the computer determines whether there exist new files to be transferred, and if so, transfers the files. If the remote station has software or data file updates to be transferred to the train, such updates are transferred to the onboard computer. To determine whether the remote station has updates to be transferred, it compares the version in the onboard computer to the version in the remote station.

The information being transferred from the onboard computer to the station includes the train performance data, track data and data from log files and event recorders connected with the onboard computer. The updating of information from the remote station to the onboard computer includes new application software and operational databases. This is in addition to the information with respect to traffic conditions, track usage and other operational limitations. If the train includes a plurality of event recorders, the information is provided to the onboard computer and then transferred therefrom. Alternatively, each event recorder may be connected to its own onboard computer and each onboard computer establishes communication to the remote station.

To determine whether a remote station is within range includes determining the location of the train and knowing location(s) of the next remote station(s). From this knowledge, communication can be attempted when in range of stations. Alternatively, the on-board computer can periodically send out a query to any base stations in range. When a remote station responds, the communication links can be established.

Locomotive files transferred from an onboard computer to a remote station may also be transferred to other remote stations, including a unique remote home base station, also to be known herein as a home base station. The home base station may act as a central data-collection and storage point for all locomotive files for all railroads. It is also the repository and distributor for the software and operational data updates that the remote station transfers to the onboard computer, and for software updates for the remote station itself.

A connection between a remote station and the home base station may be established for a number of reasons: when new locomotive files are available on the remote station; when new software or operational data is released on the home base station; upon request by a user; according to some schedule; or some combination of these or other reasons. When a connection is established, the remote station may transfer locomotive files to the home base station, and the home base station may transfer software or operational data updates to the remote station.

To determine whether the home base station has software or operational data updates to be transferred, the version in the remote station is compared with the version in the home base station. Only the additions, changes and deletions resulting from the comparison is transferred. The home base station also collects information logged by the remote station. The remote station logs operational information that includes communication statistics, which locomotives established communication and when, which locomotive files were transferred, and which software updates were sent.

A method of adjusting a simulator and processing data from an event recorder of a train or data transferred by the previously mentioned method or other available methods includes inputting the data into the simulator. The simulator is operated with the data and the simulator automatically adjusts the parameters of the simulator until the data of the simulator matches the data from the event recorder. The parameters to be adjusted include one or more of grade resistance, curve resistance, rolling resistance, tractive effect of trains, locomotives, dynamic brake effect of the train's locomotives, pneumatic brake system and train weight.

After adjusting the parameters, the input data is analyzed on the simulator. Analyzing the data includes automatically or manually identifying arbitrary anomalies as identified by the user in the input data and reporting the anomalies.

Adjusting the parameters includes comparing the simulator data and the event recorder data during a change of velocities. These changes of velocities occur during one or more of the following trip features: curves, grades, braking and throttle changes.

Wherein the train includes plural event recorders, the input data from each of the recorders is provided to the simulator simultaneously or in sequence and the simulator is operated and the parameters adjusted using data from all the event recorders from the same train. If the simulator is on board the train, the updating of the parameter can be performed on the train and stored and transmitted with event recorder data to alleviate the need for post adjustments.

Other advantages and novel features of the present invention will become apparent from the following detailed description of the invention when considered in conjunction with the accompanying drawings.

DETAILED DESCRIPTION OF THE PREFERRED EMBODIMENTS

Figure 1:
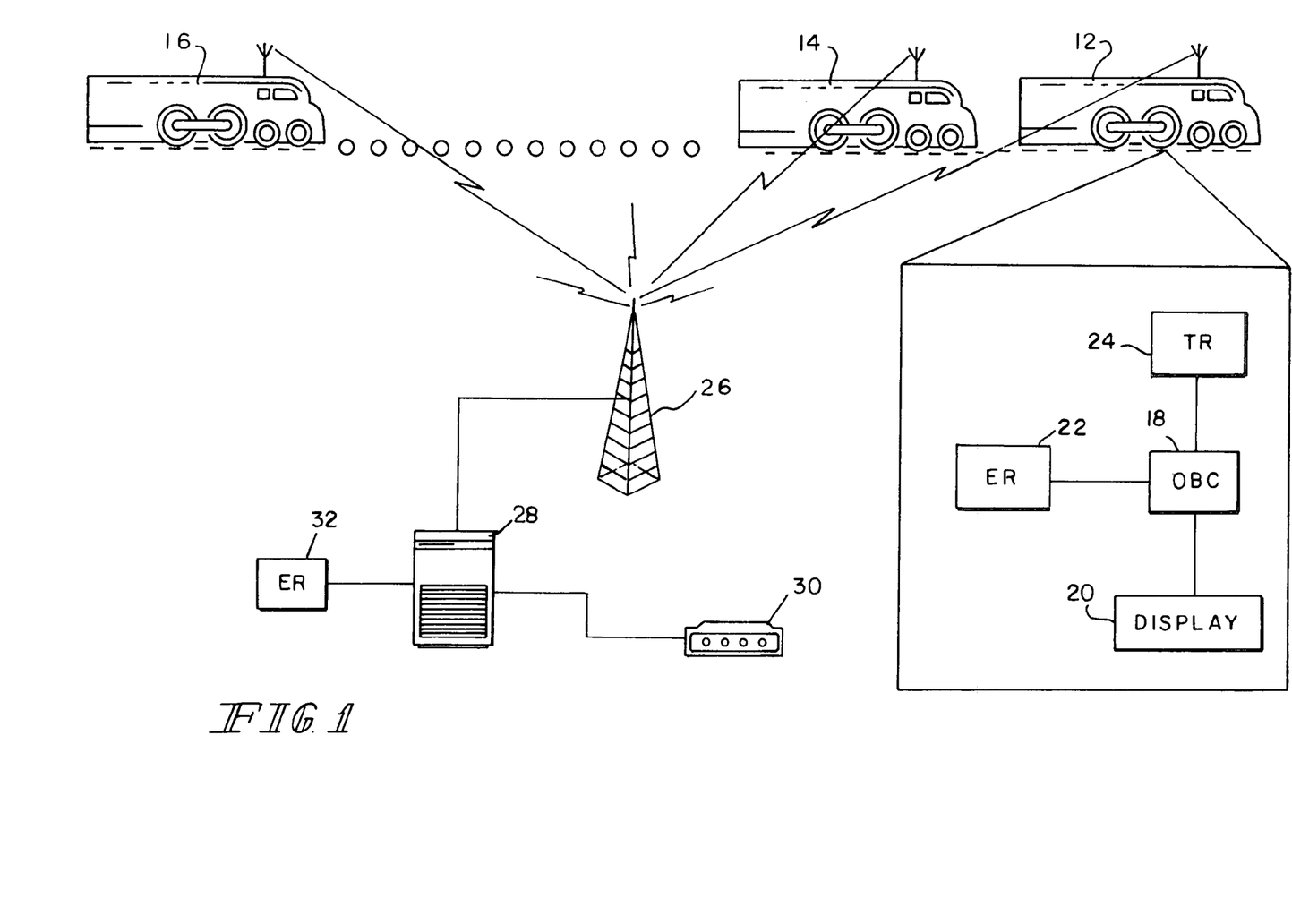
FIG. 1 is a schematic representation of train communication system incorporating the principles of the present invention.

FIG. 1 illustrates a train having head-end locomotives 12 and 14 separated from a midtrain locomotive 16 by a plurality of cars. Each of the locomotives includes at least an onboard computer (OBC) 18 connected to a display 20. It also includes an event recorder (ER) 22 connected to the onboard computer 18. The onboard computer 18, through transmitter 24, communicates with the base station or remote base station 26. The plurality of base stations 26 are provided within proximity of the tracks. The base station 26 may also be a satellite or other types of communication terminals. A data server/playback station (D/PS) 28 is connected to or is part of the base station 26. Additionally, communication with the data server/playback station 28 is provided through modem 30 to a greater network or communication system to be described with respect to FIG. 3. The base station 26 may also include an event recorder 32 by itself or in combination with data server/playback station 28.

Another type of event recorders 32 are generally adjacent the track at control points and are designed to time stamp, capture, and record status information records of the control point equipment over time. These information records can include but are not limited to: Signal aspects of information; Trains, trucks, or axles that have crossed by the Control Point; Gate position informations; Crossing Occupancy status; Indication of other trains in the vicinity; and Video and audio recordings of the area. These control points are also remote stations with their own transceivers.

The onboard computer 18 includes log files of information, data and characteristic of the locomotive. Some of these log files are from the event recorder 22. The onboard computer 18 also includes various programs of software or application software and operational databases. The data server/playback station 28 collects files from the onboard computer 18 and provides new or updated application software and operational databases to the onboard computer 18.

Each of the locomotives 14 and 16 will include their own onboard computer 18, optional display 20, event recorder 22 and transceiver 24. The individual event recorders 22 may be connected to a single onboard computer 18 which communicates to the data server/playback station 28. Alternatively, each of the on-board computers 18 on each of the locomotives 12, 14 and 16 may independently communicate its files to and receive software from the data server/playback station 28.

The on-board computer 18 may be the general on-board computer of a locomotive. It may also include a special system known as LEADER system, available from New York Air Brake Corporation. This system determines and displays information of the dynamic condition throughout the train to aid the engineer in operating the locomotive. The LEADER system uses prestored information about the track characteristics and structures along the path. It also includes information about the locomotive used in the calculation for the simulation of loads throughout the train. LEADER system also updates its data base information and this may be one of the files transmitted to data server/playback station 28.

The on-board computer determines whether a base station 26 is within range and establishes communication. To determine whether a remote station is within range includes determining the location of the train and knowing location(s) of the next remote station(s). From this knowledge, communication can be attempted when in range of stations. Alternatively, the on-board computer can periodically send out a query to any base stations in range. When a remote station responds, the communication links can be established. After this communication is established, it downloads new files to the download/playback station and receives updated software and data files.

Figure 2A:
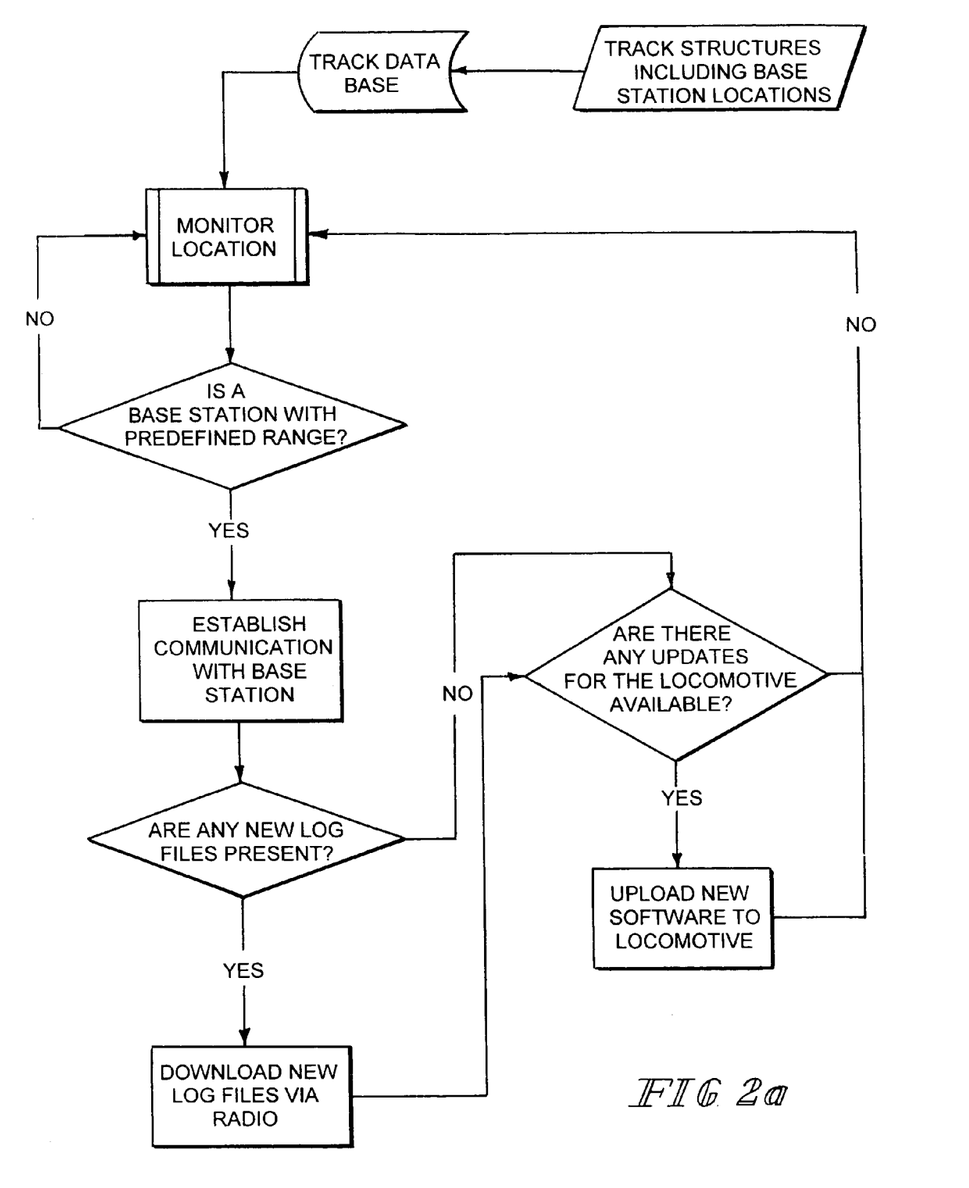
FIGS. 2a and 2b are flow charts of an automatic software and data update upload and log file download with two different methods of establishing communication according to the principles of the present invention.
Figure 2B:
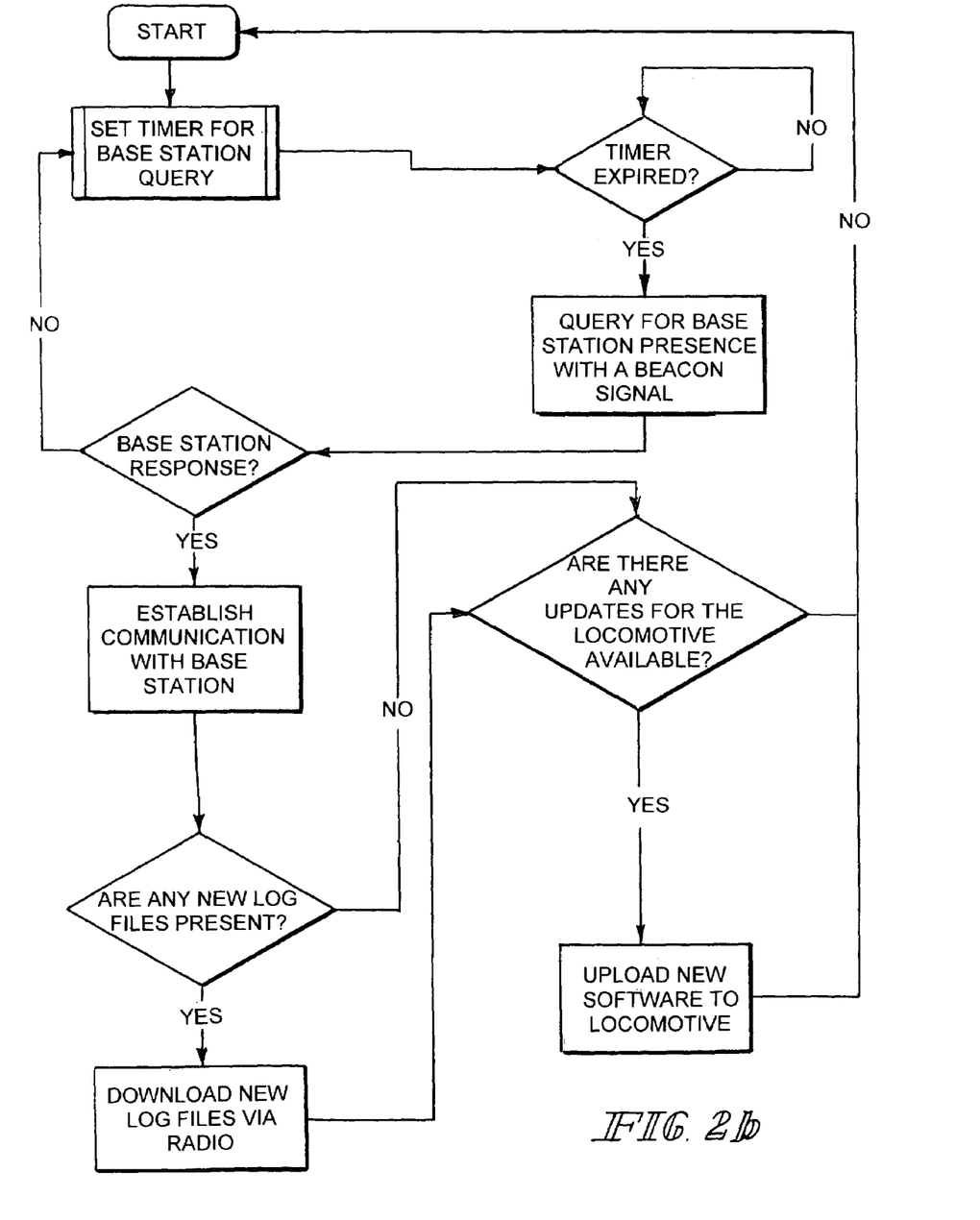

The flow chart of the method is described in FIGS. 2a and 2b. To establish communication as shown in FIG. 2a, the LEADER system includes track structure and structures including locations of base stations. The software monitors location of the train relative to the track structure. Next, it makes a decision of whether a base station is within a predetermined range knowing its location relative to the track. If the base station is within range, it establishes communication. Alternatively, as shown in FIG. 2b, a timer is set and upon the expiration of the timer, a query is transmitted. If a base station responds, communication is established. If not, a new timer cycle and query is performed.

Next, it determines whether there are any new log files present. If so, it downloads new log files to the data server/playback station 28. Next, there is a determination of whether there are any software or data file updates for the onboard computer. If there are updates, they are uploaded to the locomotive. If not, it cycles back to monitoring locations. If there are updates, and the upload is complete, communication is disrupted and the system cycles back to monitoring locations. The upload and download may be performed in any order. The updated data files may be from the data server/playback station 28 and/or the event recorder 32.

The determination of whether the software or the data files are to be updated includes determining the software or data file version or data on the onboard computer 18 and comparing it against the latest version available at the data server/playback station 28. If it is not the latest version, the update is then transmitted. This determination can be made at the data server/playback station 28 and/or the onboard computer 18 via the communication links. Alternatively, the latest version can be uploaded automatically and replace the onboard version even if it is the same.

The preferable method of transmitting updates is in the form of a delta that spans multiple versions of the updates. The update combines multiple files into a single file for easy server distribution known as packing. The delta combined with packing and compression techniques reduces the time and cost of electronic distribution of the update. The delta is a measure of the comparison between the additions, the changes and/or the deletions between the present version in the on-board computer and the new version.

The comparison may span multiple revisions. For example, the information being transmitted is a direct comparison between version A and version D and does not include the intermediate conversions from A to B, B to C, and C to D. This reduces the amount of information transmitted as well as any errors which may be introduced in the intermediate conversions.

The creation of a delta for the added and changed information is easily identified, packed and compressed; and transmitted, decompressed and unpacked. The deleted or obsolete files are also identified and this information is packed and compressed and transmitted, such that these files can be deleted. The information for deletion is an identification or instruction, not transmission of a complete delta indicating the total deletion change.

The on-board computer may not be in continual communication with any of the base stations 26 or any central stations. Communication may be selective. The LEADER system preferably is continuously running or multitasking during this communication process. Alternatively, the LEADER system may be only temporarily paused during the transmission of the files and receiving the updated software and data. This process is relatively fast and, therefore, would be imperceptible to the operator. It is desirable that the LEADER system not be paused so that there is no loss of information in the files and therefore, the files being transferred are the latest and represent a complete set. Alternatively, buffers may be provided to capture information during the transfer of files and software.

Figure 3:
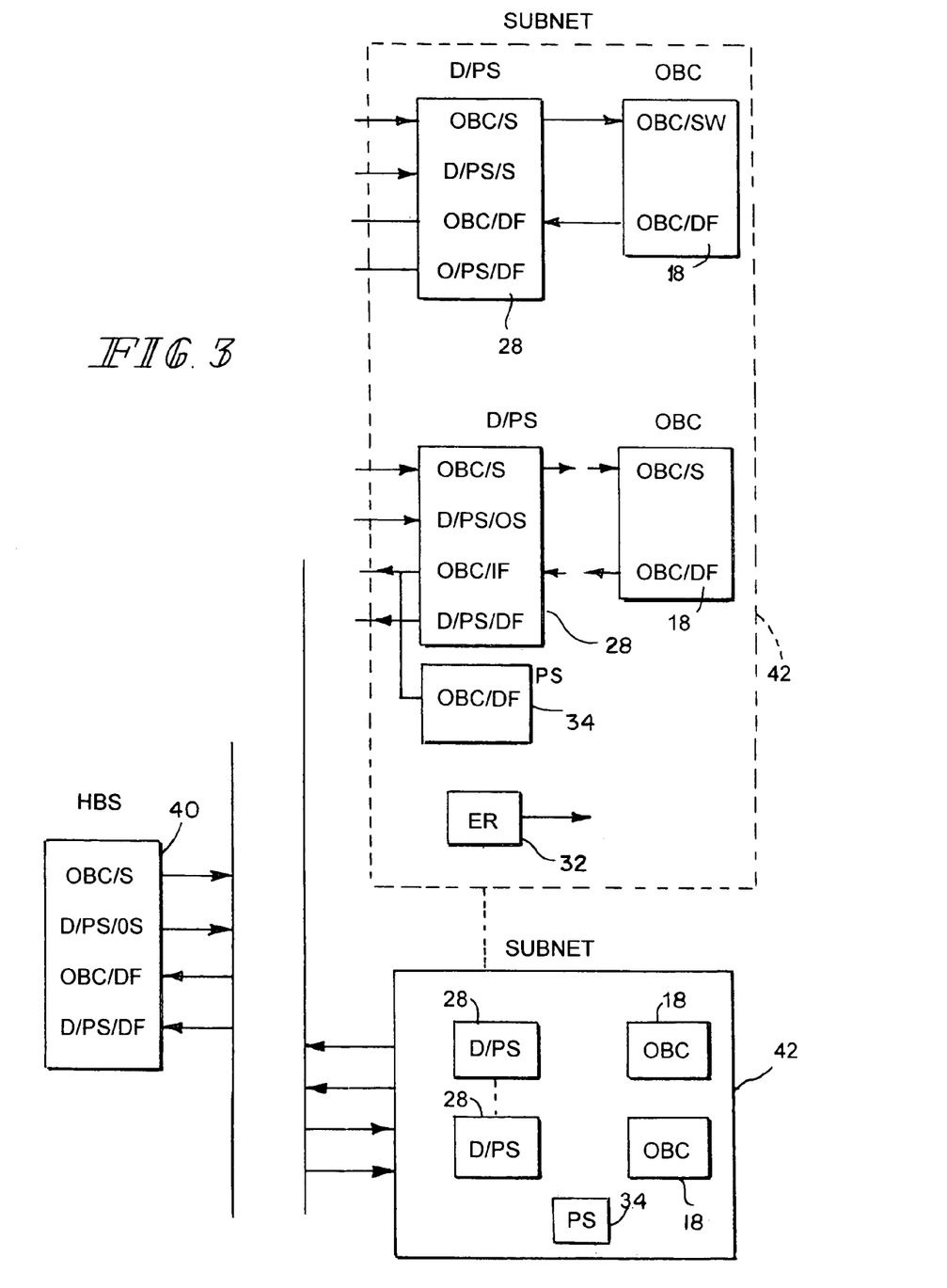
FIG. 3 is a schematic representation of software and data paths between a home base station, data server/playback stations, an event recorder, and locomotive on-board computers.

File transfers between the onboard computer 18 and the data server/playback station (D/PS) 28 may be resumed after an interruption of wireless communication. This means that transfers will eventually be completed given a sufficient number of good communication sessions. Any files that have been partially received when a transfer is interrupted are marked as incomplete by the receiving computer, and will not be used until they have been completely received and validated. Alternatively, the incomplete file may be deleted and received again in another session. Transferred files are currently validated by methods that include size, checksum and CRC checking. Invalid files are rejected and deleted. The communication sessions may be with a single D/PS 28 or different D/PS's 28. Communication between D/PS 28 or a controller or home base station or remote home base station 40, as shown in FIG. 3, will allow joining of partially received files at different DPS 28.

The files which are transferred from the onboard computer to the remote station 26 and data server/playback station 28 and subsequently to a home remote includes train performance data, track data and other kinds of data available from the event recorder 22 on the train. The data available from the event recorder 22 includes data concerning one or more of the following: control signals on the 27 pin M.U. Line, brake system pressures (brake pipe, brake cylinder, etc.) Dynamic brake signals and conditions, air flows, accessory status (horn, bell, etc.), ground fault, hot units, generator and traction motor, time of day, locomotive ID, etc.

As a LEADER equipped train approaches a control point a radio communication link can be established during which the control point computers which includes event recorder 32, and the LEADER computer identify each other. The LEADER computer can query the control point for current status information for immediate display on the LEADER display/processor. Further, the control point computer can upload an event log (time history) to LEADER system and the LEADER computer can incorporate the Control Point event log into the LEADER logfile set for storage.

When the LEADER equipped train passes by a remote station 26, it will download not only standard LEADER logfiles but also the supplemental control point logfiles correlated with the LEADER logfiles. LEADER system analysis will then be enhanced to include but not be limited to: the signal aspects before, during and after the train has passed the signal; status of the crossing gates; crossing occupancy status; and indication of other trains in the vicinity.

In addition, any maintenance information regarding the control point can be carried by the on-board LEADER system to be downloaded to the base station 26 for processing. The LEADER system playback and analysis processing can identify and report on any maintenance issues reported by the control point. The same type of information could be captured and displayed from other track side equipment such as hot box detectors where a radio link can be established and utilized for real-time exchange.

In general the locomotive becomes a vehicle to transport data from distributed location control points to a more central location or remote station 26. Software updates for control points can be accomplished the same way software updates for LEADER system. The LEADER equipped locomotive becomes a vehicle to carry the software update from a central point or remote station to the control points where the update is downloaded via a radio link.

By using the train communication system to relay the information from the control point to a home base station, the sophistication and cost of the transceiver for the control point and event recorder 32 can be substantially reduced.

FIG. 3 expands FIG. 1 to show the connectivity on the network. The data server/playback station (D/PS), are nodes on the network. The arrows show the flow of information between the components of the nodes. A single D/PS may exchange information with a plurality of onboard computers (OBC), either simultaneously or sequentially. A single OBC may exchange information with a plurality of D/PS, but not simultaneously. The transfer of OBC data files (OBC/DF) from the OBC to the D/PS, and the transfer of OBC software (OBC/S) from the D/PS to the OBC, is via wireless communication as previously detailed.

The network also allows a D/PS to exchange OBC files with one or more other remote D/PS. This makes analysis and playback possible from any remote station, and the redundancy provides one means to backup the OBC files.

The connection is via some network such as voice telephone lines or the Internet or wireless. A connection may be established when a D/PS has new OBC files to share, or according to some schedule, or by some combination of these or other triggers.

A D/PS may also connect to one or more playback station (PS) 34, which is nothing more than a station without the ability to communicate with the OBC. A PS can receive OBC files from the D/PS. It may be portable, in which case the connection is via RS-232, Ethernet, or some other similar media, and the connection is established by the user. A PS may be remote, in which case the connection is via some network such as voice telephone lines or the Internet or wireless, and the connection is established either by the user or as needed by a D/PS.

An event recorder 32 at a control point is also shown. It may communicate directly to an OBC or through a D/PS.

The D/PS includes log files of information pertaining to its own operation. These log files D/PS/DF include activity and performance information such as which locomotives established contact and when, which OBC software updates were sent to a locomotive, which OBC files were received from a locomotive, communication statistics, and any other information that may prove useful. The D/PS also includes operational software D/PS/OS.

A unique station on the network, called the home base station (HBS) 40, connects to a plurality of D/PS. The connection is via some network such as voice telephone lines or the Internet or wireless. A connection may be established for a number of reasons: when a D/PS has new OBC files to share; when new D/PS or OBC software has been submitted to the HBS; upon request by a user; according to some schedule; or by some combination of these or other triggers.

The HBS is a repository for both OBC and D/PS software updates. Software updates are submitted to the HBS, where they are stored and electronically distributed to the D/PS. The HBS determines if it must send a software update to the D/PS by comparing the latest version stored on the HBS with the latest version on the D/PS. The D/PS installs D/PS/S software D/PS/OS updates that it receives. The D/PS also acts as a repository for OBC software updates OBC/S, which it transfers to the OBC as described previously.

The HBS will receive and store D/PS log files D/PS/DF, which can be used for report generation, to analyze communication problems, and so forth. It may also receive and store OBC files for all locomotives for all railroads, making them available for analysis, simulation, report generation, and so forth, and providing a means to backup the files.

One or more railroad subnets 42 exist within the network. A subnet groups together the OBC, D/PS and PS nodes according to the territorial boundaries or operating ranges of a particular railroad, subdivision, or other entity. FIG. 3 shows, for example, a plurality of D/PS, one PS and two OBC as part of one subnet. The OBC's are shown communicating with a specific D/PS. The subnet may include any number of D/PS, PS or OBC.

An OBC is preferably a member of only one subnet, and usually it will only establish a connection with D/PS nodes on that subnet. However, under special circumstances an OBC may connect with D/PS on one or more "foreign" subnet (i.e., subnets may overlap, or even merge). When this occurs, the OBC may transfer OBC files to the foreign D/PS, and the D/PS may transfer OBC software to the OBC.

A D/PS is a member of only one subnet, and usually it will only establish a connection with other D/PS and PS nodes on that subnet (and with the HBS). However, under special circumstances a D/PS may connect with D/PS on one or more "foreign" subnets. For example, when a D/PS receives foreign OBC files, it may transfer those files to the D/PS on the foreign subnet directly or through the HBS 40. This ability for subnets to intersect and interact can be useful. For example, if the AB and CD railroads merge into the ABCD railroad, the two subnets are able to merge.

The network is defined by a callbook. A callbook contains connection information for nodes on the network such as subnet identifier, connection type (e.g., modem), GPS locations of D/PS sites, telephone numbers, Internet addresses, and so forth.

When a new locomotive is commissioned for an existing subnet, the OBC software installed on the locomotive contains the (unchanged) callbook for that subnet. Because a locomotive OBC initiates contact with D/PS, and not vice versa, adding (or removing) a locomotive does not alter the network configuration in any way. A D/PS will adapt to a new locomotive without any reconfiguring.

When a D/PS is commissioned or decommissioned for an existing subnet, or if its connection information changes, (for example, telephone number), the callbook is updated and electronically distributed to the D/PS and OBC on that subnet. Because a locomotive OBC initiates contact with a D/PS, and because a D/PS initiates contact with other D/PS, changes to a D/PS therefore require changes to the callbook.

When a subnet is commissioned or decommissioned, the callbook is updated and installed on the OBC and D/PS for that subnet. A new subnet 42 comes into existence, for example, for a new railroad or geographic territory.

Although the communication used as an example has been radio frequency between the OBC and D/PS and wired communication between D/PS and HBS, other wireless communication technology may be used. This could include cellular or other wireless telephonic technology.

Figure 4:
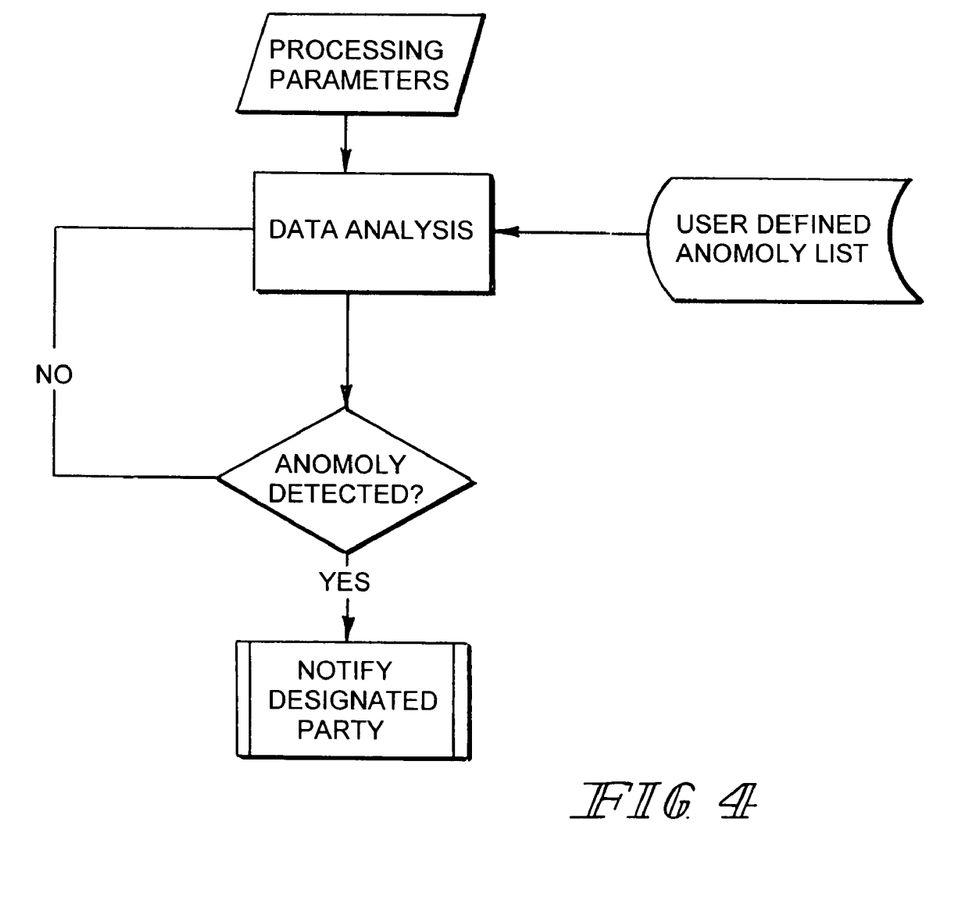
FIG. 4 is a process of analyzing data from event recorders according to the principles of the present invention.

The processing of information from the onboard computer and preferably from the event recorders is processed according to FIG. 4. The received information is inputted into a simulator so as to process the parameters. This method matches the parameters of the data from the train with that of the simulator such that the simulator automatically reflects the actual train. After the parameters have been processed, the data is then analyzed. Automatically, arbitrary anomalies identified by the user are searched for. If they are not found, the processing continues. If they are found, there is a notification to a designated party. The notification can be provided through modem 30 which also provides access to the raw information or any report or analysis of parameters. The notification can also be provided by visual indication on screen or in a file.

If an anomaly is found in an automatic processing session, the anomaly along with the information about the train (location, time, crew, train makeup, railroad, log file numbers) is also transmitted such that a more detailed manual analysis can be constructed.

The present system receives event recorder information from all of the locomotives throughout the train and determines the appropriate parameters. The data from all of the event recorders 22 of the train and control point event recorder 32 are processed to increase the accuracy of the simulator and therefore the analysis of the data.

Figure 5:
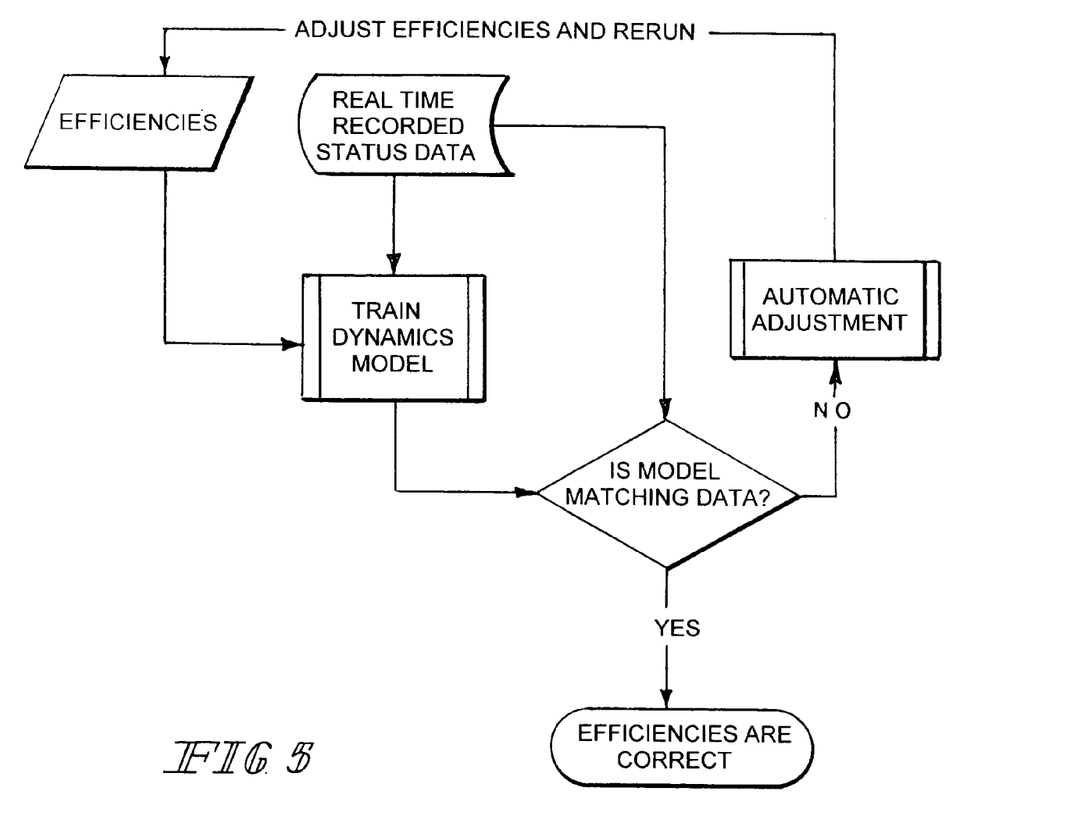
FIG. 5 is a flow chart of adjustment of a math model of a simulator based on real data according to the principles of the present invention.

A processing of parameters before the analysis of the data is illustrated specifically in FIG. 5. The efficiency coefficients of the train and trackage, for the analysis on the simulator, include, but are not limited to more of the following: grade resistance, curve resistance, rolling resistance, tractive effort of the locomotives, dynamic brake effort of the locomotives, pneumatic brake systems and train weight.

In order to determine which parameters to adjust, what direction in which to make the adjustment and what magnitude to make the adjustment, it is necessary to isolate, as much as possible, features of the trip being analyzed. The trip features should be those which generally produce a change of velocity. The trip features could include, but are not limited to, curves, grades, braking or throttle changes. All of these are those which result in acceleration or deceleration as appropriate. The efficiencies are used by a train dynamic model simulator compared with a real time recorded status data. The determination is whether the model data is matching the data. If it is, the efficiencies are correct. If not, efficiencies are automatically adjusted. This step is repeated until an acceptable match is found. A combination of the parameters are used. Preferably, the match or best fit is determined using a least square error. This is an improvement over the manual tuning of efficiencies discussed in Nickles' U.S. Pat. No. 4,827,438.

The purpose of the simulator is to provide the same kind of display as the LEADER system display in the cab. This allows an operator to view and analyze the performance of the locomotive, performance of the crew, track structure traversed, and analysis data at the data server/playback station 28.

In a playback session, each control point parameter can be shown graphically on the LEADER playback screen, in real-time relation to train position. Currently, the location of a signal is shown symbolically and the playback operator would know when the train passed by the signal. With the addition of Control Point status information, the LEADER playback would show the signal aspect and when the aspect changed states with respect to the train's location. The LEADER playback can then offer a more complete recreation of the train operation. Thus, for example, the signal status in relation to the train position is available for an accident investigation where the timing of the signal change is being called into question.

Although the processing of the information from the train is shown as being on a simulator off the train, the LEADER system on the train can also be used to do the same anomaly search on-board with LEADER as off-board with a playback machine/simulator. The LEADER system would analyze the data in real time to adjust the efficiency coefficients and parameters it uses in the simulation of train states and display using the method of FIG. 4. The LEADER system estimates and displays in-train forces, brake system status, propulsion system status and other considerations throughout the train. If the on-board LEADER automatically updates the parameters, they can be stored with the log data and transmitted to the base station. Thereby expediting an analyses.

If a LEADER system equipped locomotive is coupled with a train containing non-LEADER system-equipped locomotives, the LEADER System will have no knowledge of the non-LEADER-equipped locomotives. The lack of knowledge will introduce errors into the LEADER calculations. To solve this problem, either all locomotives must be equipped with LEADER Systems (at least the I/O Concentrator measurement and communication portion) or the LEADER "expert" system must be able to determine the unknown locomotive states from the information available.

The algorithms used to determine the unknown locomotive states is an adaptive observer and represents an expert system approach to identifying unknown information based on current known information and an understanding of how the train dynamics work as a whole. The LEADER "expert" system will identify the unknown information based on differences between measured and calculated parameters, as shown in FIG. 5, for example. The differences are used as an input to the expert knowledge database and an estimate of the unknown information will result.

The LEADER "expert" system computer algorithm uses the known location of the train and the track database, which represents the shape of the terrain. The expert system determines whether the train is currently being pulled up or down a grade, the magnitude of the grade, if the train is being pulled through a curve, the magnitude of the curve, how much horsepower the locomotives should be producing in tractive effort given the current propulsion system command, and how much horsepower is being generated by the dynamic brake system given the dynamic brake command. By combining all this information, an intelligent LEADER System will self tune its algorithms and identify the unknown train behind it.

Examples of automatic tuning of efficiencies using adaptive observer algorithms are as follows:

EXAMPLE 1

A LEADER system equipped train consist of three locomotives with full up LEADER Systems on each including GPS, radio communication, and I/O Concentrators. This allows a full status update of each locomotive in real time. The energy balance equations are showing the train is consistently moving slower than it should overall all types of terrain. This would indicate the train is heavier than reported or the rolling resistance is greater than estimated. By monitoring the magnitude of the energy imbalance as related to geographic features, LEADER system will automatically identify and modify the appropriate efficiency factor (train weight or rolling resistance in this case) or combination of efficiency factors.

EXAMPLE 2

Using the same setup as Example 1, the energy imbalance is found to make the train go faster than expected but not consistently. The adaptive observer algorithm determines that the increased speed occurs around corners and therefore adjusts the curve efficiency down to compensate.

EXAMPLE 3

Using the same train as above but with only head end equipment the LEADER System now has incomplete status information lacking data from the two trailing locomotives. As the train movement begins, the LEADER System assumes the two trailing locomotives exactly mimic the head end (or lead) locomotive. As an energy imbalance is found the adaptive observer tunes the train by adjusting horsepower capability of the two trailing units, dynamic brake efficiency of the two trailing units as well as other train efficiencies such as rolling, curve, grade resistance, and air brake efficiency.

EXAMPLE 4

In all the above examples it was assumed that the train consist information was known including details of car weight, brake type, locomotive type, car length and geometries, and car positions. If this data was not available or reported to LEADER system in error, LEADER system will again use the energy imbalance to determine what the true consist parameters are. This calculation is done in aggregate but results in a good representation of the train consist.

There are many combinations of conditions the adaptive observer will tune for, but the general approach will be the same: To identify anomalies in the energy balance equation, relate them to specific events and adjust the train efficiencies to compensate.

As the "LEADER Expert" algorithm is operating live, in real time, the efficiencies get more and more accurate. These adjusted efficiencies will be downloaded so they can be used during playback and analysis saving time in the set-up of an analysis session.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of transferring files between a computer onboard a train and remote base stations, the computer having a data base, the data base including track structure information and location information about multiple remote base stations, the method comprising:
   collecting one or more of event recorder data, train performance data and track data from onboard in files on the on-board computer;
   determining from the data base the location of the train relative to the track structure and whether the train is within communication range of one of the remote base stations, the determining being made by using location information about the train, information about the track structure and location information about the multiple remote base stations from the data base stored on the computer onboard the train;
   establishing from onboard the train a wireless communication with one of the multiple remote base stations determined to be within communication range; and
   determining onboard the train which of the files are new since a last transmission and transferring the new files to one of the multiple remote base stations determined to be within communication range.

2. A method according to claim 1, including determining whether the remote base station has updates to be transferred and transferring the updates to the on-board computer.

3. A method according to claim 2, wherein the updates include one or more of software updates for the on-board computer, operational data and callbook that defines with which remote base stations the onboard computer will initiate communication.

4. A method according to claim 2, wherein determining whether the remote base station has updates to be transferred includes comparing the version in the on-board computer to the version in the remote base station and transferring only the additions, changes, and deletions resulting between the comparison.

5. A method according to claim 1, wherein, after an interruption of wireless communication, file transfers may be resumed during one or more subsequent communication sessions until all files have been received successfully.

6. A method according to claim 1, wherein the train includes plural event recorders and including transferring data from each of the event recorders to the on-board computer.

7. A method according to claim 1, wherein
   the train includes plural event recorders each being connected to a respective on-board computer; and
   the method includes initiating wireless communication between the on-board computers and the remote base station, and transferring event recorder data from each of the on-board computers to the remote base station.

8. A method according to claim 1, including
   transferring the files from the remote base station to a simulator;
   operating the simulator with the transferred files; and
   adjusting parameters of the simulator until data of the simulator matches data from the file.

9. A method according to claim 8, wherein the parameters include one or more of grade resistance, curve resistance, rolling resistance, tractive effort of the train's locomotives, dynamic brake effort of the locomotives, pneumatic brake system parameters, and train weight.

10. A method according to claim 8, analyzing the data from the files on the simulator after adjusting of the parameters.

11. A method according to claim 1, including establishing communication between the remote base station and a remote home base station; and determining what files have to be transferred and transferring the files.

12. A method according to claim 11, wherein the files to be transferred from the home base station to the remote base station includes one or more of software updates for the remote base station, software updates for the onboard computer, operational data for the onboard computer, and a callbook that defines with which remote base stations the onboard computer will initiate communication.

13. A method according to claim 11, wherein the files to be transferred from the remote base station to the home base include one or more of files received from the on-board computer and files including operation information of the remote base station.

14. A method according to claim 13, wherein operational information includes one or more of: locomotives contacted, which software updates were transferred, which onboard computer files were received, and communication statistics.

15. A method according to claim 11 wherein communication is established between the remote base station and the remote home base station when one or more of the remote base station has new files from the on-board computer, the remote home base station has new software for the remote base station or on-board computer, requested by user and according to a schedule.

16. A method according to claim 1, including establishing communication between two remote base stations; and determining what files have to be transferred and transferring the files.

17. A method according to claim 16, establishing communication and transferring files between remote stations for all the remote base stations in a subnet.

18. A method according to claim 1, wherein one of the remote base stations includes track data, and further including the step of transferring the track data from one of the remote base stations to the on-board computer and subsequently transferring track data from the on-board computer to another remote base station.

19. A method according to claim 18, including displaying the track data on the train.

20. A method according to claim 18 wherein the track data includes one or more of signal aspect, crossing gate position, crossing occupancy status, and other trains in the vicinity.

21. A method according to claim 18 including correlating train performance data with track data.

22. A method according to claim 1, wherein the determining of the location of the train uses a GPS.

* * * * *